(12) United States Patent
Thomson et al.

(10) Patent No.: US 9,569,182 B2
(45) Date of Patent: Feb. 14, 2017

(54) INTEGRATED DEVELOPMENT ENVIRONMENT AND METHOD

(75) Inventors: Neil Thomson, Inverness (GB); Grzegorz Roman Pusz, Wroclaw (PL)

(73) Assignee: APTITUDE SOFTWARE LIMITED, Hampshire (GB)

(*) Notice: Subject to any disclaimer, the term of this patent is extended or adjusted under 35 U.S.C. 154(b) by 1 day.

(21) Appl. No.: 13/400,451

(22) Filed: Feb. 20, 2012

(65) Prior Publication Data

US 2013/0205275 A1 Aug. 8, 2013

(30) Foreign Application Priority Data

Feb. 3, 2012 (GB) .................................. 1201929.5

(51) Int. Cl.
*G06F 9/44* (2006.01)

(52) U.S. Cl.
CPC . *G06F 8/34* (2013.01); *G06F 8/10* (2013.01); *G06F 8/20* (2013.01); *G06F 8/24* (2013.01)

(58) Field of Classification Search
CPC ............... G06F 8/34; G06F 8/10; G06F 8/20; G06F 8/24
USPC ........................................................ 717/105
See application file for complete search history.

(56) References Cited

U.S. PATENT DOCUMENTS

| | | | | |
|---|---|---|---|---|
| 5,588,108 | A * | 12/1996 | Kumar et al. | 715/765 |
| 5,987,246 | A | 11/1999 | Thomsen et al. | |
| 6,366,300 | B1 * | 4/2002 | Ohara et al. | 715/771 |
| 7,139,979 | B2 * | 11/2006 | Schultz et al. | 715/763 |
| 8,522,196 | B1 * | 8/2013 | Kim | G06F 11/3664 717/100 |
| 2002/0080157 | A1 * | 6/2002 | Chickles et al. | 345/700 |
| 2002/0083415 | A1 * | 6/2002 | Jazdzewski | 717/111 |
| 2004/0109031 | A1 * | 6/2004 | Deaton et al. | 345/848 |

(Continued)

FOREIGN PATENT DOCUMENTS

| | | |
|---|---|---|
| EP | 2341476 | 7/2011 |
| EP | 2354925 | 8/2011 |

(Continued)

OTHER PUBLICATIONS

Merriam webster definition of "arrange". http://www.merriam-webster.com/dictionary/arrange.*

(Continued)

*Primary Examiner* — Viva Miller
(74) *Attorney, Agent, or Firm* — Thompson Hine LLP

(57) ABSTRACT

A method of creating a software application using an integrated development environment, IDE, running on a computing device having at least a processor, a memory, a display device and an input device. The method includes retrieving from the memory and providing on the display device a number of graphical elements each representing at least one operation to be performed on data. The method further includes enabling a user of the computing device to select and arrange at least some of the graphical elements on the display device using the input device. The method includes enabling the user to arrange graphical links between the selected graphical elements, wherein the selected graphical elements and the graphical links together form one or more graphical models of a process to be performed on data by the software application, and displaying in the IDE a 3D representation of the graphical model or models.

27 Claims, 15 Drawing Sheets

(56) References Cited

U.S. PATENT DOCUMENTS

| | | | |
|---|---|---|---|
| 2006/0150149 A1* | 7/2006 | Chandhoke et al. | 717/109 |
| 2006/0247805 A1* | 11/2006 | Thomson et al. | 700/86 |
| 2007/0256054 A1* | 11/2007 | Byrne et al. | 717/113 |
| 2008/0082961 A1* | 4/2008 | Adams et al. | 717/109 |
| 2008/0122835 A1* | 5/2008 | Falco, Jr. | 345/419 |
| 2008/0295036 A1* | 11/2008 | Ikeda et al. | 715/848 |
| 2008/0313573 A1 | 12/2008 | Nelson | |
| 2009/0216341 A1* | 8/2009 | Enkerud et al. | 700/17 |
| 2010/0169059 A1* | 7/2010 | Thomas-Lepore et al. | 703/1 |
| 2011/0054770 A1* | 3/2011 | Allen et al. | 701/200 |
| 2011/0055680 A1* | 3/2011 | Williamson | G06F 9/4443 715/212 |
| 2011/0252163 A1* | 10/2011 | Villar et al. | 710/16 |

FOREIGN PATENT DOCUMENTS

| | | |
|---|---|---|
| EP | 2354926 | 8/2011 |
| GB | 2423382 | 8/2006 |
| WO | 2012/031899 | 3/2012 |

OTHER PUBLICATIONS

GB, Search Report, Application No. GB1201929.5 (May 31, 2012).

Stasko, J., "Software Visualization" (Mar. 29, 2005).

EP, Examination Report, European Application No. 13153701.1, Dec. 23, 2014.

EP, Second Office Action, European Patent Application No. 13153701.1 (Aug. 10, 2016).

Gil et al. "Three Dimensional Software Modelling," Proceedings of the 1998 International Conference on Software Engineering. ICSE '98, Kyoto, Japan, (Apr. 19-25, 1998).

Radfelder et al. "On Better Understanding UML Diagrams through Interactive Three-Dimensional Visualization and Animation," AVI '00 Proceedings of the Working Conference on Advanced Visual Interfaces (2000).

* cited by examiner

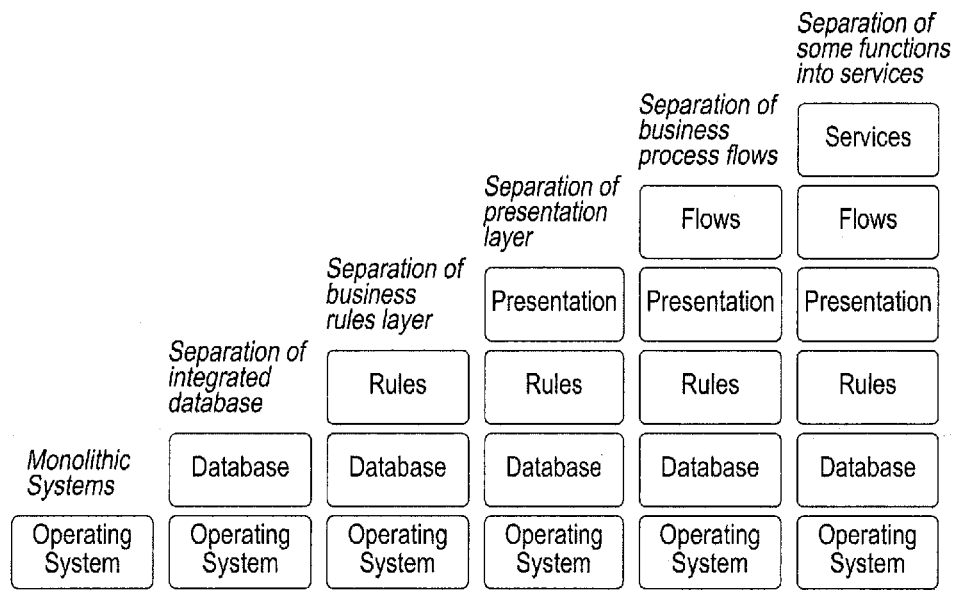
Prior Art    Fig. 1
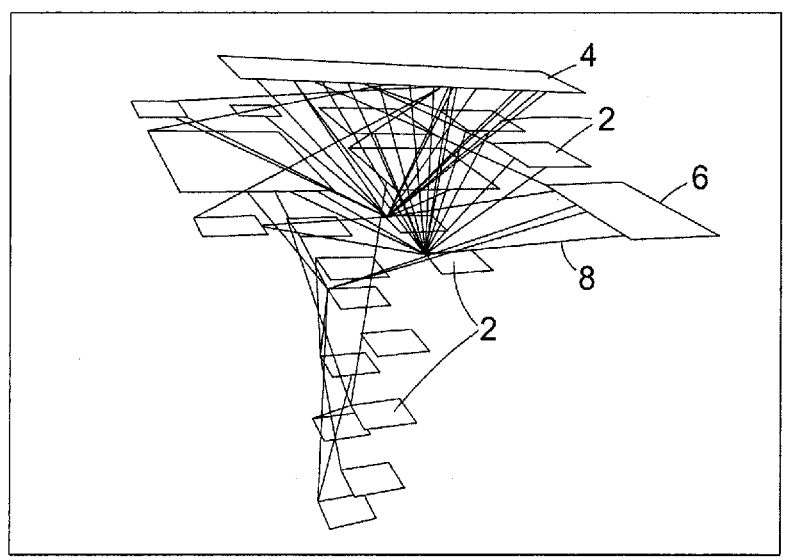
Fig. 2

INTEGRATED DEVELOPMENT ENVIRONMENT AND METHOD

This application claims priority to United Kingdom Patent Application No. 1201929.5, filed on Feb. 3, 2012, the entire contents of which are incorporated by reference herein.

FIELD

The invention relates to an Integrated Development Environment, and related method of creating software applications.

BACKGROUND

The present specification describes features which build on the applicant's earlier Microgen Aptitude products. For example features of Microgen Aptitude V3.00 are described in the applicant's earlier European Patent Application No. 10196007.8 (Publication No. 2,354,925) and a number of other applications. Microgen Aptitude V3.00 is a development of Microgen's earlier Aptitude product which is described in U.S. patent application Ser. No. 11/341,156 (Publication No. US-2006-0247805-A1) and corresponding European Patent Application No 06100913.0 (Publication No. 1,686,466). It should be understood that the invention and the embodiments described below may incorporate features of any earlier Microgen Aptitude product, and any of the features described in the applications mentioned above, and the entire contents of the applications identified above are incorporated by reference herein.

Aptitude is a program with a graphical interface which allows users to create complex applications without knowledge of traditional programming languages. Graphical elements, also referred to as icons, can be connected together using graphical links in order to create graphical models of processes and rules which are later converted into computer instructions.

Conventionally, computer programs are written in a programming language such as Cobol, Pascal, C++ or Java. The programs so produced consist of a set of files containing "source code" which is simply text written using the lexicon and obeying the syntax of the language. The source code is then compiled or translated into machine code and executed. The development environment for producing, managing and compiling these programs is called an "IDE" or Integrated Development Environment; "Integrated" because it normally comprises a set of tools such as compilers, linkers, debuggers, etc.

The programs in the source code files often "call" each other forming links or dependencies between them. It should be noted that the source code files and their links do not represent the logical "structure" of the software as a particular functional component such as a business rule may be coded in a large number of files with multiple dependencies so there is no clear correspondence between a source code file and particular piece of functionality.

More recently, programs designed for commercial applications have been divided into layers where the layers comprise different "models" of the final program. Typically the models are defined using source code. Essentially each layer is a collection of one or more models of the same type. Such models may for example be concerned with Business Rules, Data Flow, Screen Presentation, Database, etc. as shown in FIG. 1.

This architecture which is widely used by "Business Process Management Suites" (BPMS) has produced a radically different type of IDE which is able to cope with multiple models and to integrate them into an executable program; the development tools for each model usually generate source code—most frequently Java—which is then combined with the code from the other layers to produce an executable program.

Microgen Aptitude falls into this class of product but has taken a radically different approach whereby no source code is generated or required; each layer has an associated "modelling tool" which allows the Business User to model the Rules (say) graphically. The graphical models that are produced are diagrams comprising graphical elements (icons), and may for example represent processes and rules used in the Aptitude software. The graphical models that are produced for each layer are then combined and translated into intermediate code or "p-code". Unlike source code, this is not human readable but is interpreted by an execution engine so automating the business model.

All IDE's have a "Viewer" where the user can see all the different components (traditionally source code files) of an application. There may be hundreds or thousands of source code files and the organization of these in a manner which allows the structure of the project to be visible, is a considerable challenge. Most Viewers provide a folder or tree structure organization of the project components and these work to some degree when the project consists of a homogeneous set of source code files; however, when a layered architecture is employed where each layer consists of a different set of models, these folder or tree structures fail to provide a means to organize the many models and layers effectively.

SUMMARY

In one embodiment the invention provides a method and Integrated Development Environment, IDE, as set out in the accompanying claims.

BRIEF DESCRIPTION OF THE FIGURES

FIG. 1 shows a layered architecture used for example in Business Process Management Suites;

FIG. 2 shows a screenshot of a view in accordance with one embodiment of the invention;

FIG. 14 shows a model and only those models on which it is directly dependent;

FIG. 15 shows the addition in the 3D viewer of models selected in the 2D viewer;

DETAILED DESCRIPTION

Figure 3:
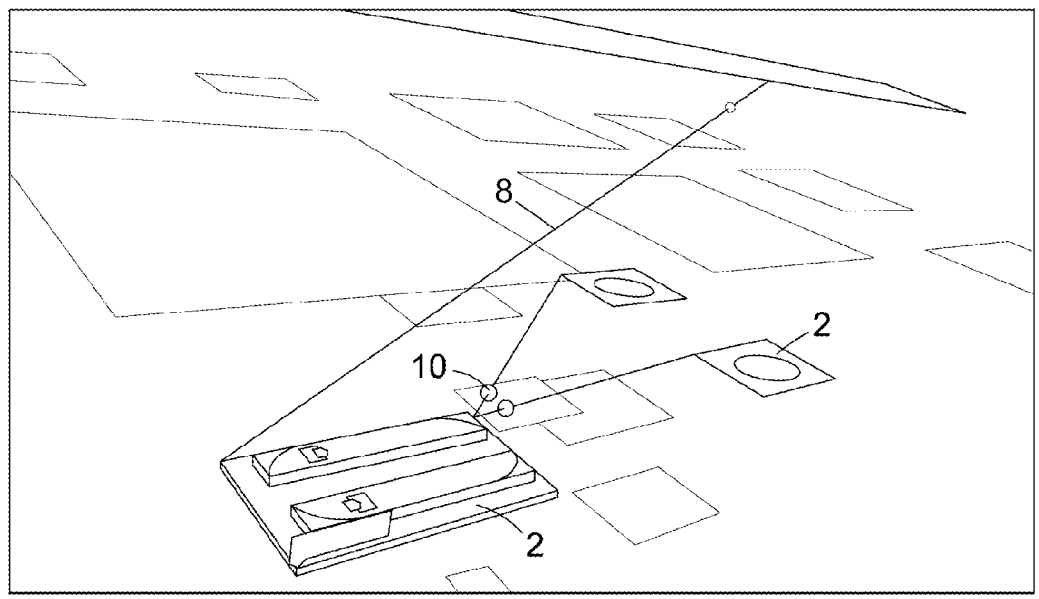
FIG. 3 shows an example of models linked by lines provided with moving symbols showing the direction of the relationship.

Modern Business Process Management Suites segment software applications into different layers such as Business Rules, Data Flows and Presentation Layers. Each layer contains a number of models of the same type.

Each model is not source code but is rather a graphic "model" of part of the business process. Such an architecture requires a different type of Integrated Development Environment (IDE) which, rather than managing multiple files of source code, is able to organize and display the different layers and the many different models that exist for each layer. Unlike source code, the different models of each layer correspond to functional or logical components of the total application and each one may have a functional link with other models.

It is important that the developer is able to see the structure of the whole application and standard IDE Viewers cannot achieve this. They become very clumsy and inadequate when the application is complex containing hundreds or thousands of models spread across different layers such that it becomes impossible to see the project as a whole and to manage its complexity. The result is errors within the application and increased cost and duration of the development program and subsequent testing.

We describe herein features of a product which we refer to as Microgen Aptitude 3D, which seeks to remedy this deficiency by displaying the layers and their models as a 3D representation.

FIG. 2 shows a screenshot from Aptitude 3D, in which different models 2 are shown as a 3D representation which can be rotated by the viewer, so as to be viewable from any angle. Within 3D space, the different layers are displayed using the vertical axis and the models are organized using the two horizontal axes. This architecture makes possible a number of features all designed to help with the management of complexity and to provide the user with clear and useful views of the application. In this way the layers of the architecture are shown as layers of the 3D representation. In FIG. 2 for example the top layer 4 is formed from a single Business User Diagram (described below). The layer 6 below this is formed from a collection of eight models 2 of the same type, and subsequent layers are arranged below this.

Aptitude 3D is suitable for displaying projects where a layered architecture of application models is employed. If we consider the z axis to be a vertical axis and the x and y axes to be perpendicular horizontal axes then Aptitude 3D displays a project such that each model type is shown in a different layer at a different height on the z axis and the different models within each layer are organized in planes parallel to the "x" and "y" axes.

We now describe a number of different models, together with their constituent graphical elements.

The models which will be described here include:
Business User Diagrams
Business Process Diagrams
Microflows
Control Flows
Business Rules
Application Processes
Application Forms
SQL Rules
SQL Procedures
Enrichment Schemas and Data Schemas The graphical elements used in these models are shown in FIGS. 17 to 26, which will now be described.

Figure 17:
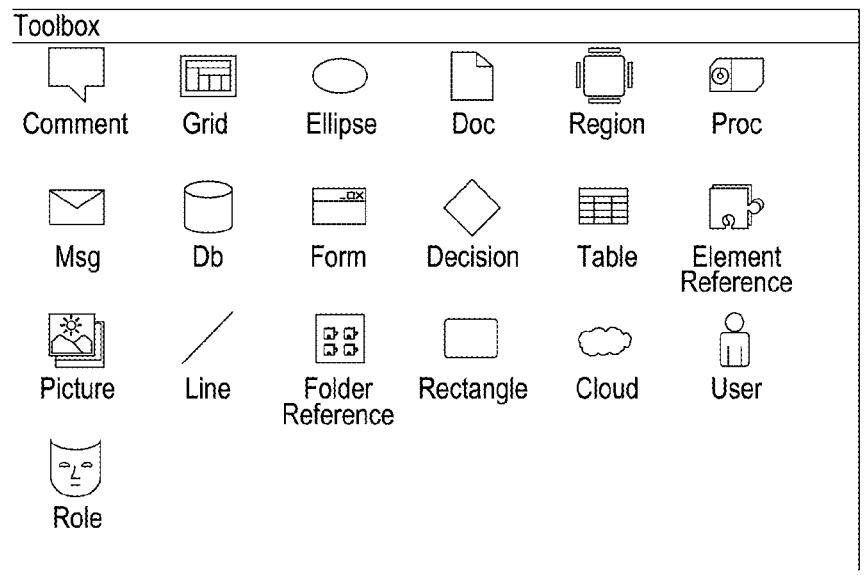
FIGS. 17 to 26 show graphical elements used in different models for use with various embodiments of the invention.

FIG. 17 shows some of the graphical elements which are available for use in Business User Diagrams. This is a high level model which is produced by the Business User. It has no syntax and the elements are concerned with drawing rather than being specialised elements.

Figure 18:
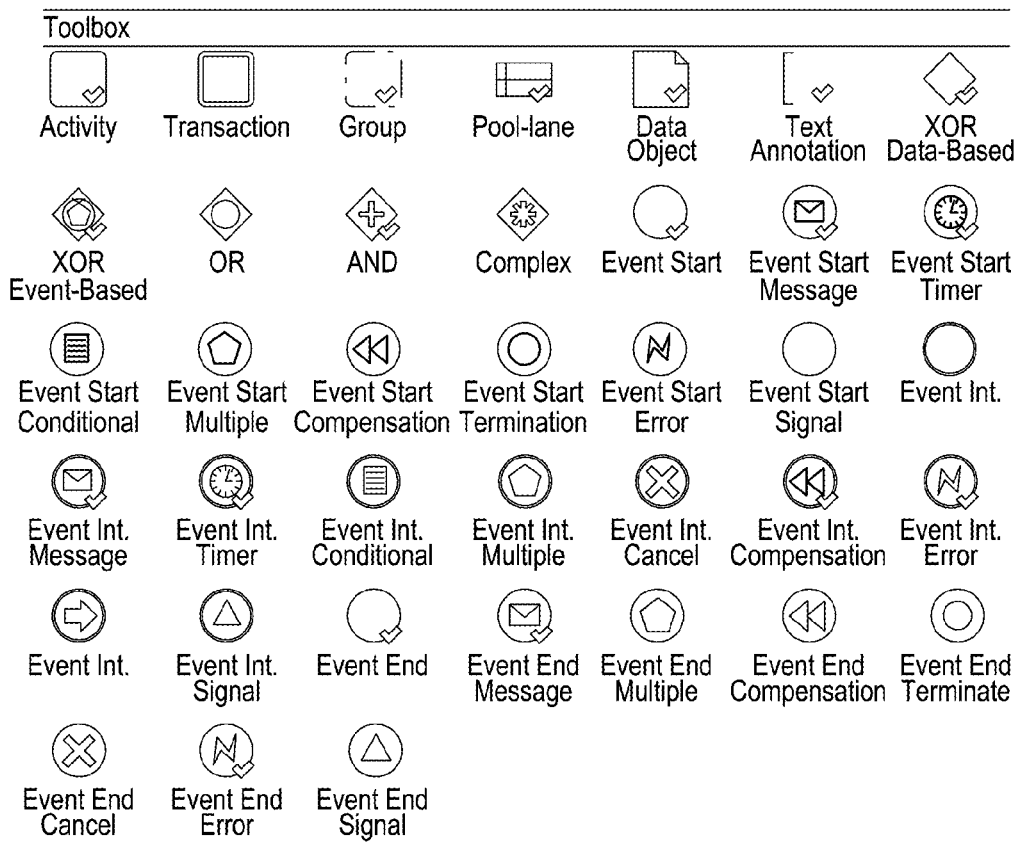

FIG. 18 shows some of the graphical elements which are available for use in Business Process Diagrams. This is written by an IT person in collaboration with the business. It conforms to an industry standard language called "Business Process Modelling Notation" or BPMN.

Figure 19:
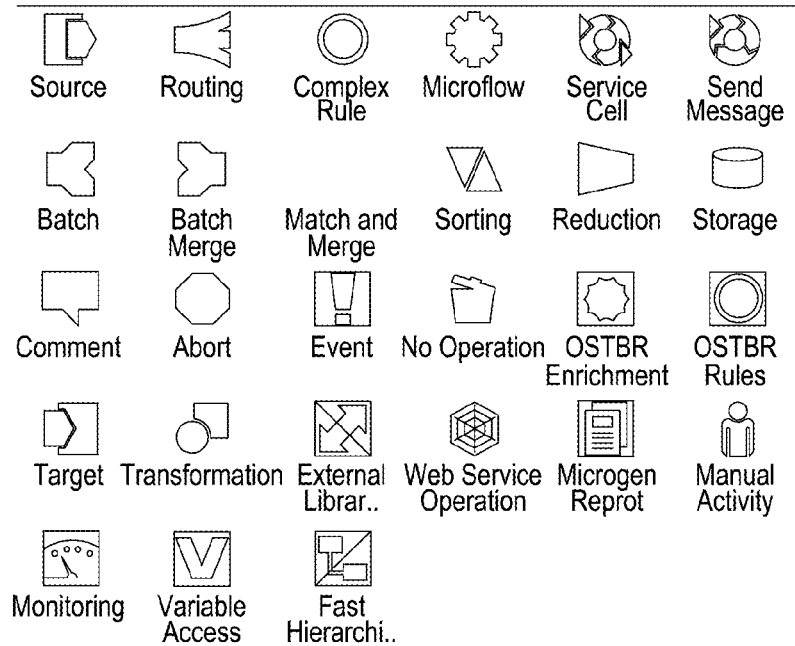

FIG. 19 shows some of the graphical elements which are available for use in Microflows (data flows): These are proprietary and designed to model data flow.

Figure 20:
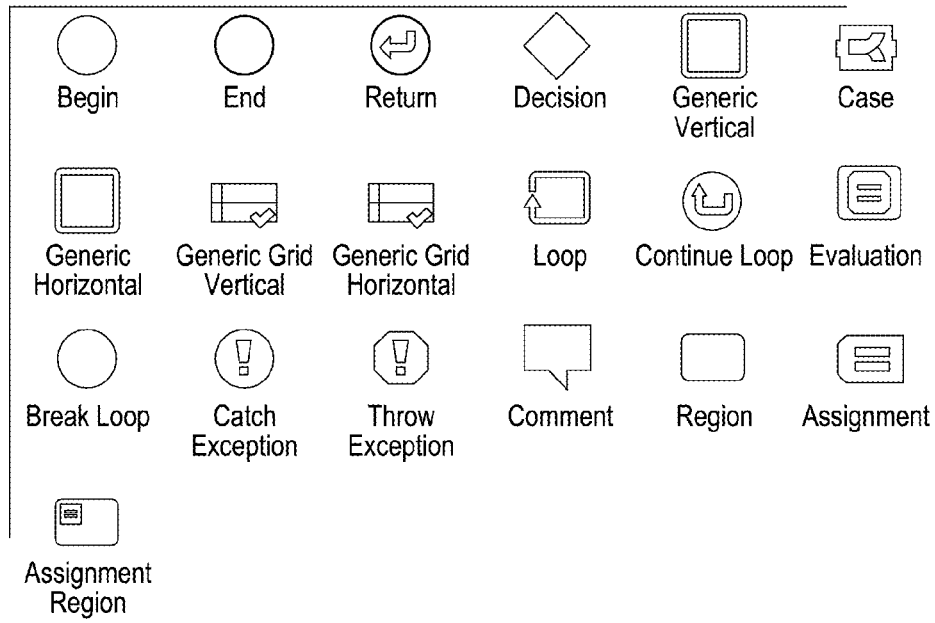

FIG. 20 shows some of the graphical elements which are available for use in Control Flows: These are proprietary and designed to model control flow.

Figure 21:
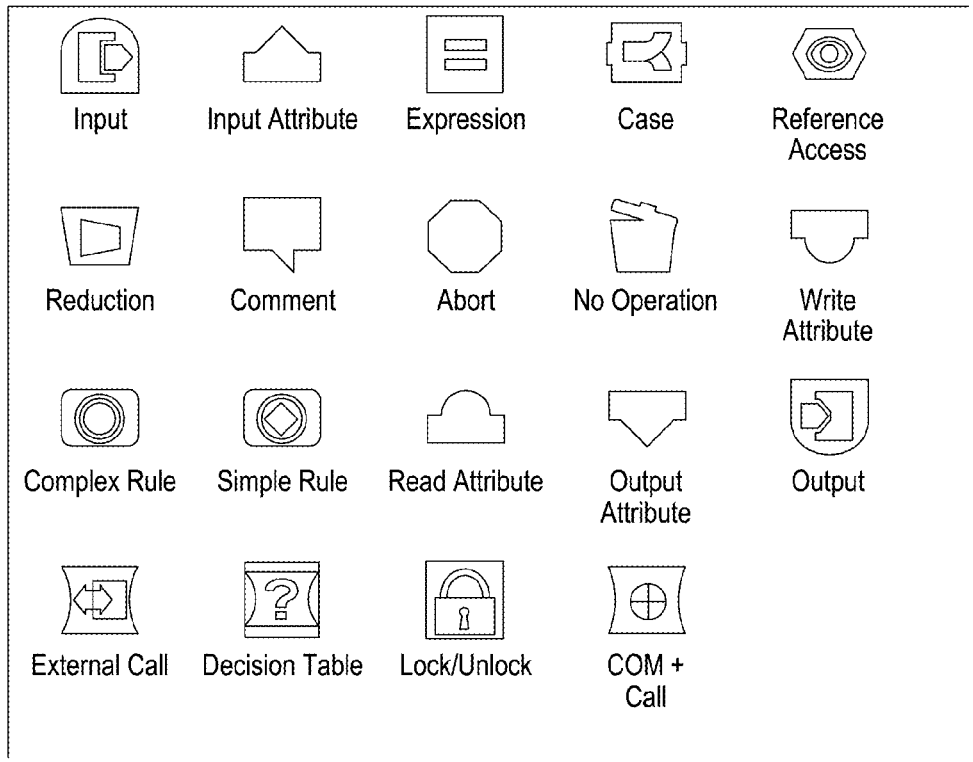

FIG. 21 shows some of the graphical elements which are available for use in Business Rules. This is proprietary and the elements have been chosen to allow both simple and very complex rules to be modelled.

Figure 22:
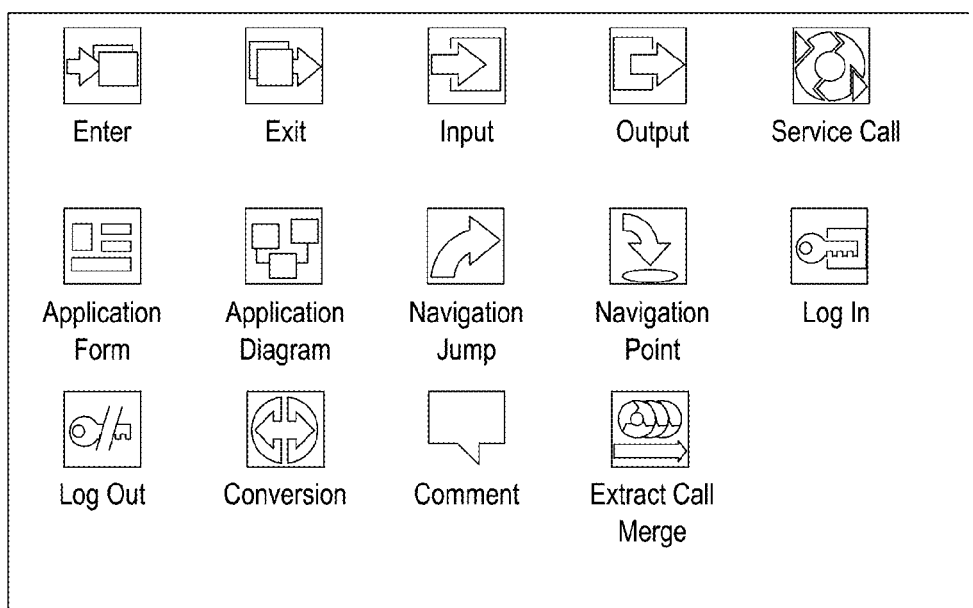

FIG. 22 shows some of the graphical elements which are available for use in Application Processes. These are proprietary and used to model the user interface of the application (including e.g. the navigation through the screens (forms) of the navigation which may be conditional, the menu system structure, the operations performed on user actions, the login and logout, the application security i.e. privileges granted for users to perform some actions etc.)

Figure 23:
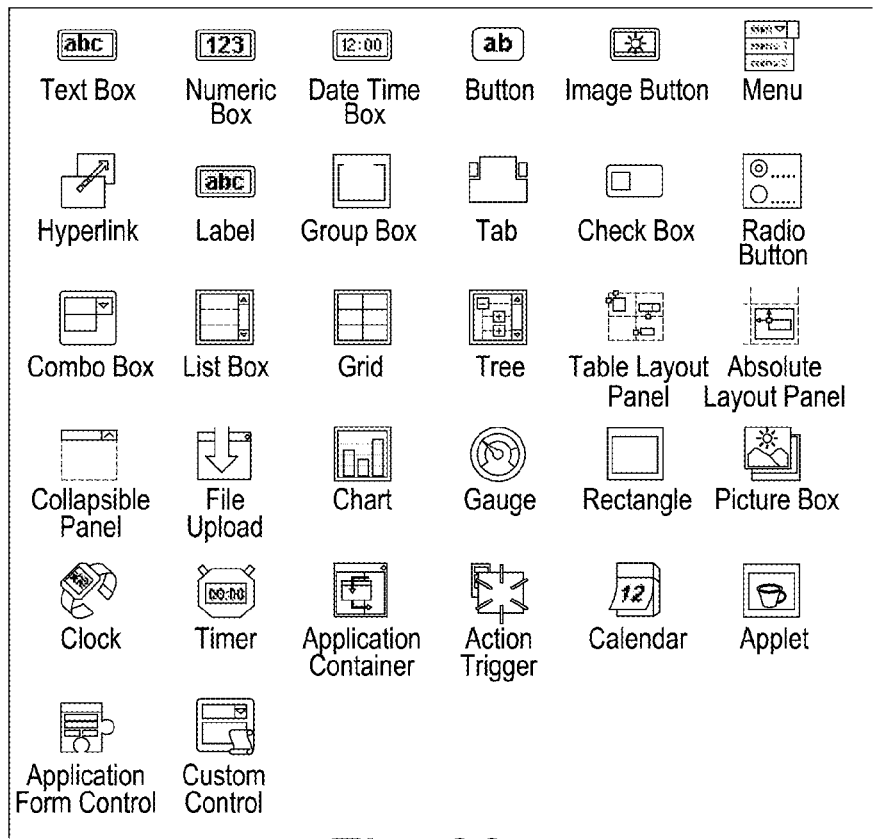

FIG. 23 shows some of the graphical elements which are available for use in Application Forms. These are used to model the forms (screens) of the application—their look and contents i.e. the controls like edit boxes, grids or buttons to be used by application's users. They model the functionality of the forms.

Figure 24:
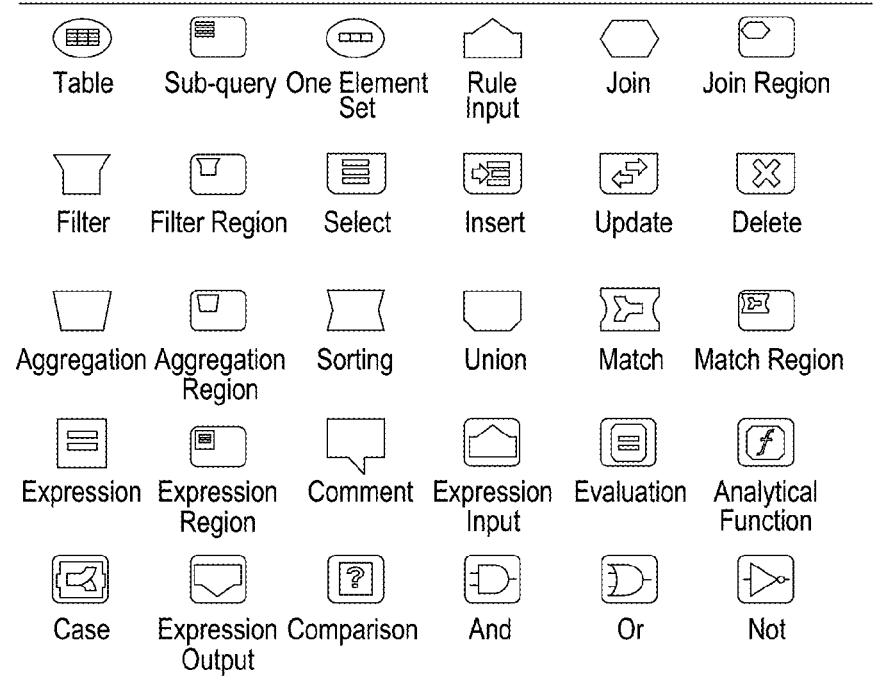

FIG. 24 shows some of the graphical elements which are available for use in SQL Rules. These elements make it possible to model the business rules for the subsequent execution in the databases using SQL language (proprietary).

Figure 25:
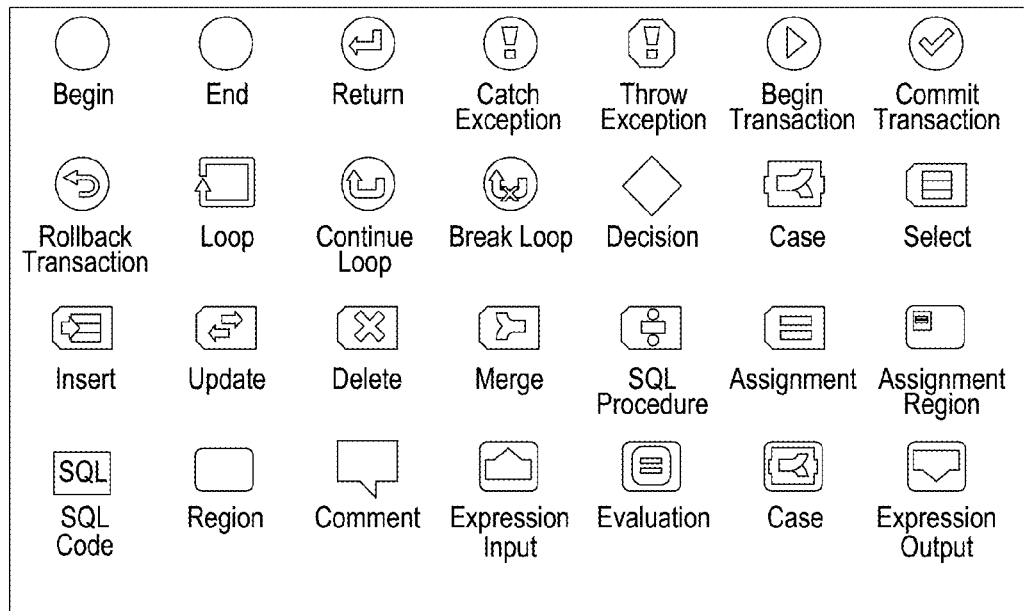

FIG. 25 shows some of the graphical elements which are available for use in SQL Procedures. These are used for modelling the business procedures for the subsequent execution in the databases using SQL procedures (proprietary).

Figure 26:
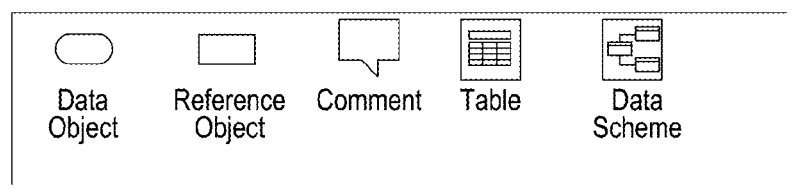

FIG. 26 shows some of the graphical elements which are available for use in Enrichment Schemas and Data Schemas—modelling the relationships between various data objects, reference objects and tables used in an Aptitude project.

Lower level models include:
External Data Formats (EDF) which model the data as it is held in an external system
Data Objects (DO) which model the data held within Aptitude
Mappings model the relationship between the EDF's and the DO's
Enrichment Schema produce a "view" of the database by building a model of tables and their relationships.
Devices provide a model of external systems which supply or receive data, e.g. a database.

These models do not employ a graphic model using a blank sheet and a tool box like the higher level models. Rather, they use a dialogue driven editor which constructs a much more structured and constrained model.

As shown for example in FIGS. 2 and 3, lines 8 are displayed between various models 2. The lines linking the different models show the dependencies between them. Note that these may correspond to "calls" from one model to another and may include lines 8 containing animated balls 10. The balls 10 move along the lines 8, and the direction in which the balls 10 travel indicates the direction of the dependency. An example is shown in FIG. 3.

Aptitude 3D may automatically generate and draw some lines representing links between models, and in addition users can add links manually to show some additional or special relationships between the models. Links can be drawn between elements which are positioned any number of layers apart. In addition, many links can originate from a single model.

Figure 4:
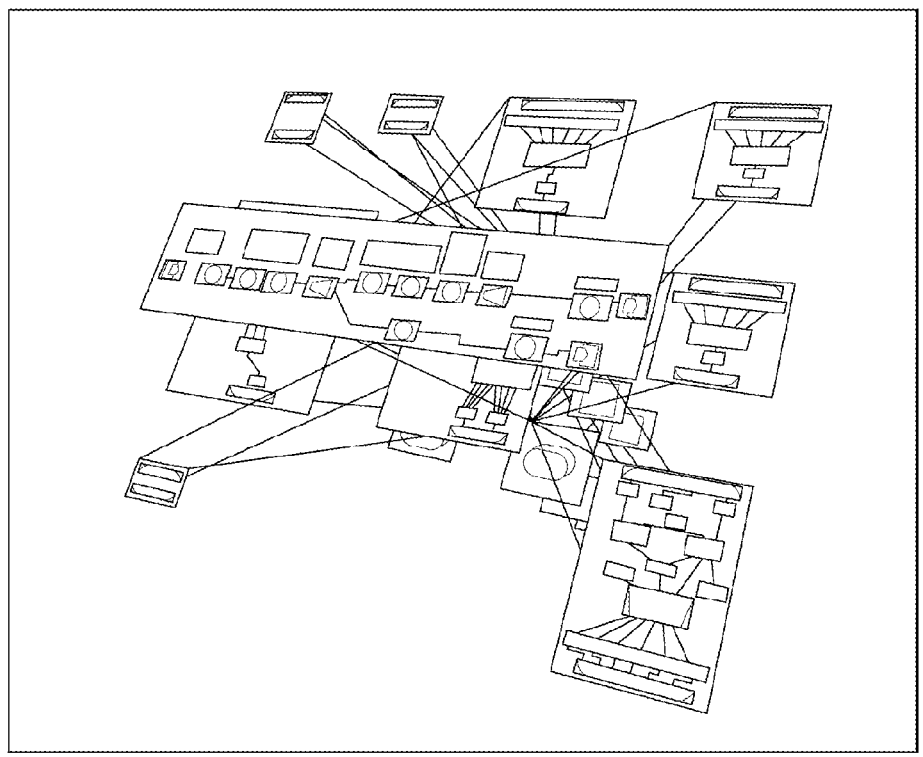
FIGS. 4 and 5 show two different views of the same project.
Figure 5:
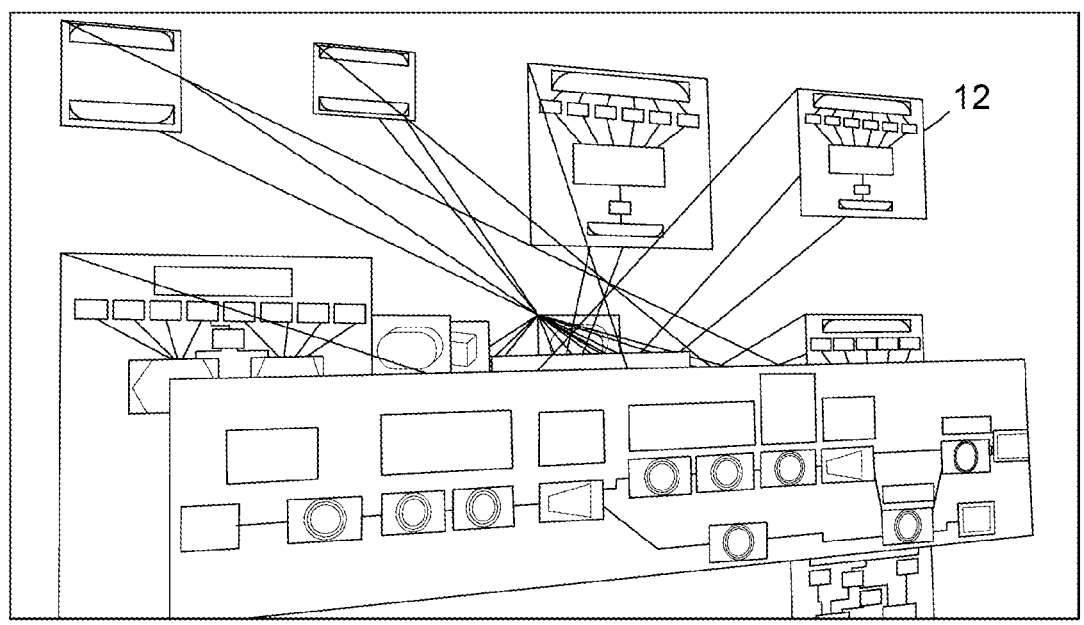

By using a computer mouse, for example in combination with the "Shift", "Ctrl" and "Alt" keys, it is possible to pan and zoom around the picture and to rotate it around any chosen axis. FIGS. 4 and 5 show two different views of the same project.

In addition the spacing between the different layers can be increased or decreased using a slider control, which may again be controlled by a computer mouse.

A user can create additional layers or sub-layers to better organize the 3D View of the project. If needed, models 2 can be moved between layers manually.

Figure 6:
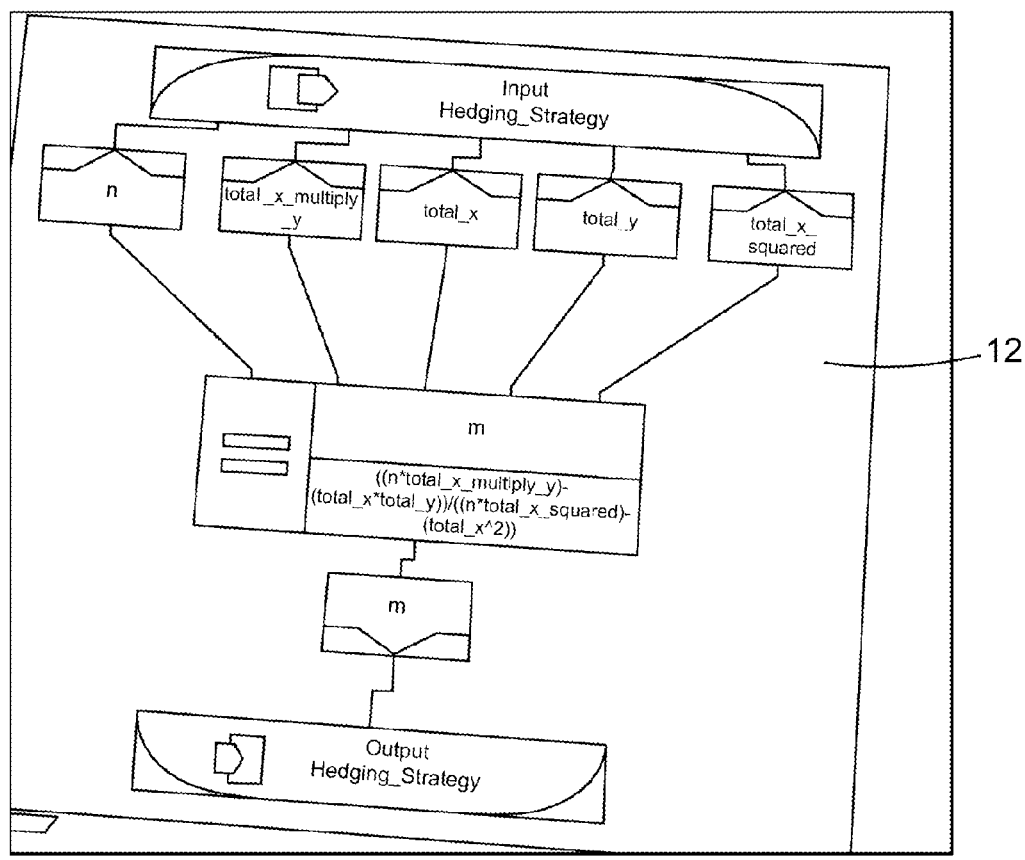
FIG. 6 shows a zoomed-in view of a model in FIG. 5.
Figure 7:
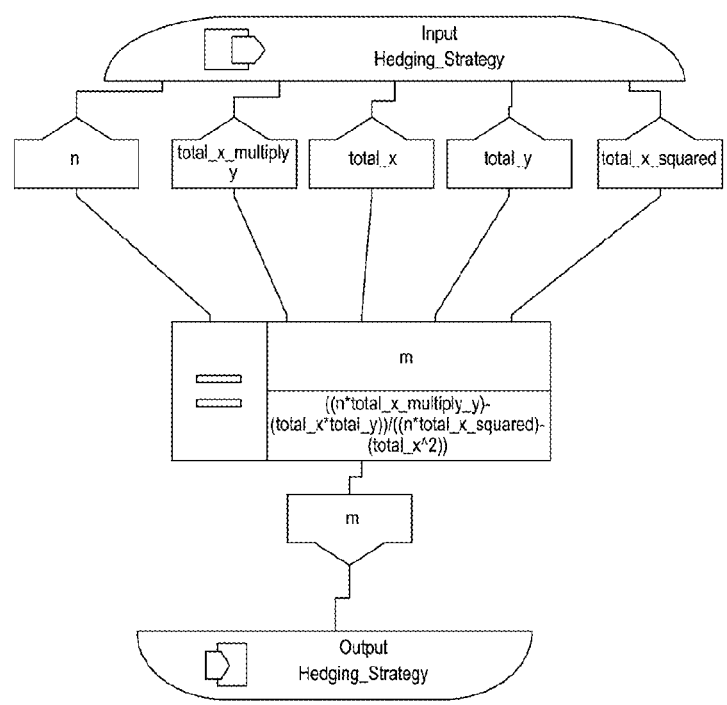
FIG. 7 shows the model of FIG. 6 in its associated editor.

The different models are not shown as "icons" within the viewer but as scaled copies of the graphical models that would be seen when creating or editing the model using the IDE editor. As an example, a model 12 in FIG. 5 is chosen, and a zoomed-in view of the model 12 in the viewer is shown in FIG. 6. The corresponding view of the model 12 within its associated editor is shown in FIG. 7.

Figure 8:
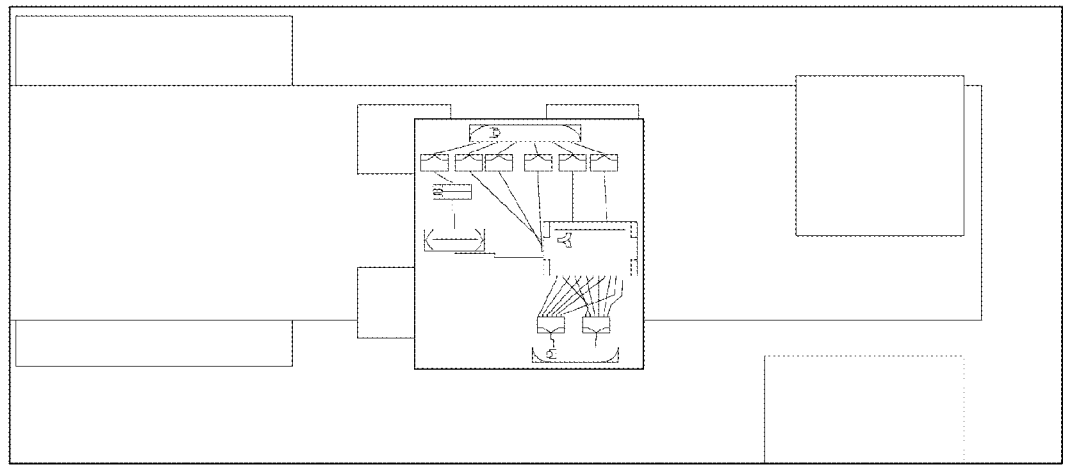
FIG. 8 shows a chosen model, with all other models displayed in reduced contrast.

Movement between the editors and viewers is simple. Clicking on a model with the Ctrl key, for example, held down moves to the editor for that model and on closing the editor after making changes, the user is returned to the 3D Viewer where the changes are visible. Double clicking on any model causes it to be highlighted and all other models to be shown with much reduced contrast as shown in FIG. 8.

Large projects may have many hundreds of elements and even the 3D view provided by Aptitude 3D can appear complex. The invention may contain a number of features designed to manage this complexity.

Figure 9:
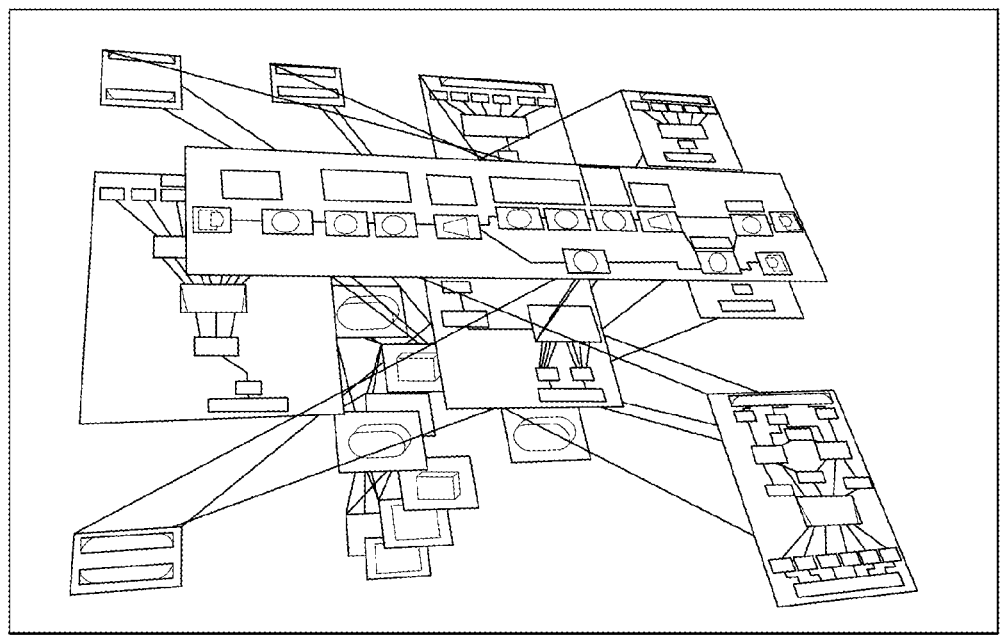
FIG. 9 shows a complete project.
Figure 10:
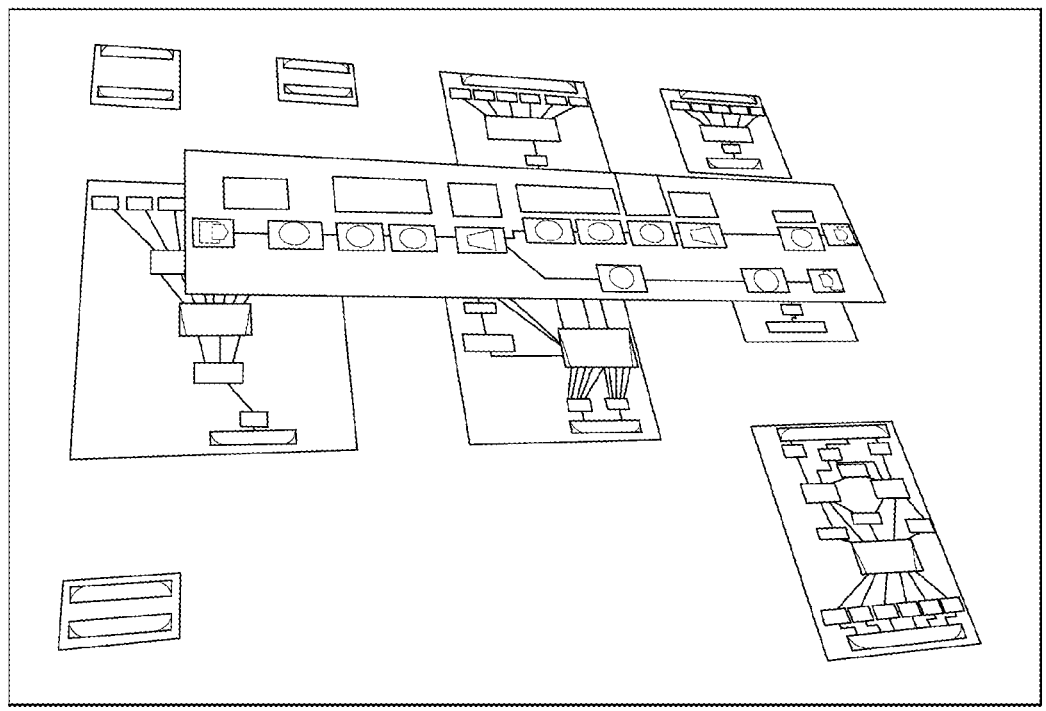
FIG. 10 shows the project of FIG. 9 with only the rules and data flow models present and the connections removed.

The first is the facility to turn on and off the connections and particular layers or types of model. For example, a user might only want to see the rules and process flows and hide or remove the lower level models concerned with database connectivity. FIG. 9 shows the complete project while FIG. 10 shows the same project with only the rules and data flow models present and the connections removed.

Figure 11:
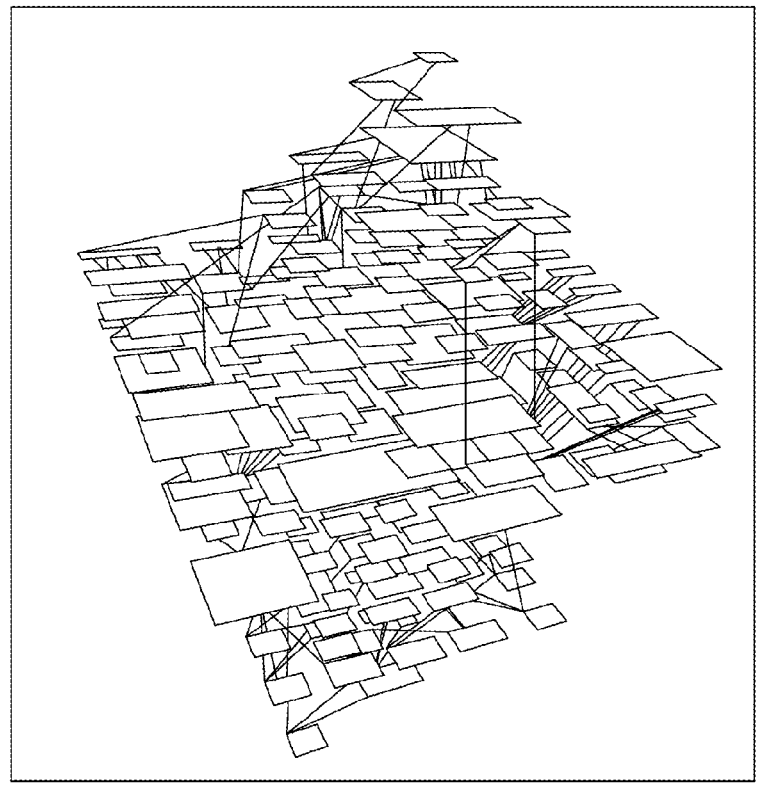
FIG. 11 shows a large complex project.
Figure 12:
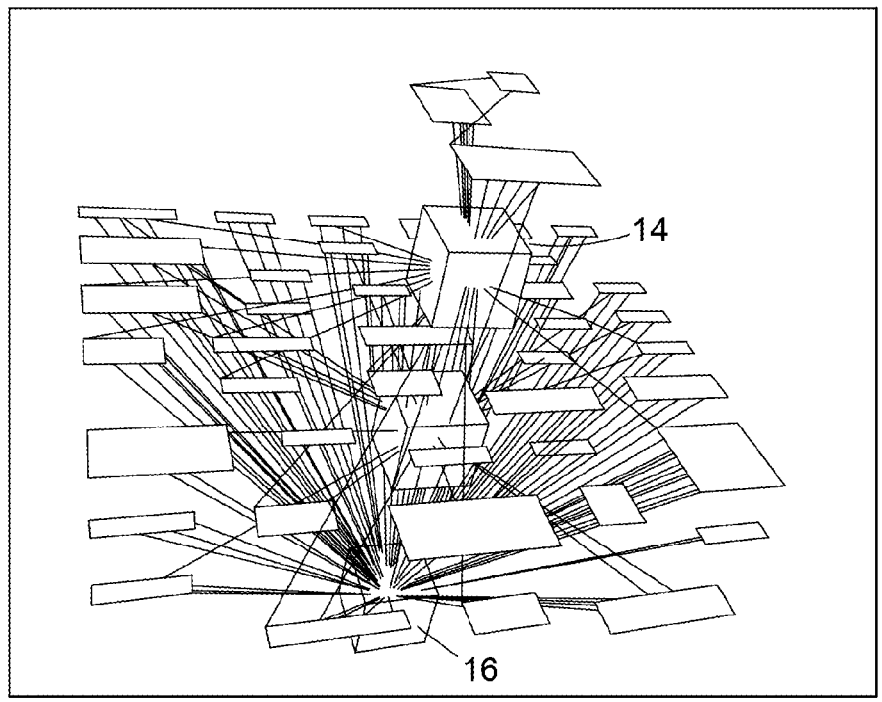
FIG. 12 shows the project of FIG. 11 with a number of models black boxed.

Another method by which complexity of the diagram can be reduced is to "black box" sets of models in which the user is not interested. Unlike the previous method, this is not restricted to a particular layer. FIG. 11 shows a large complex project and FIG. 12 shows the same project with a number of models black boxed.

In this instance three black boxes have been used. In this example the upper "black box" 14 is yellow and contains diagrams and forms relating to web applications, the middle box is red and contains graphical rules, and the lower box 16 is blue and contains devices and external data formats.

Any set of elements (possibly of different types) from either one or multiple layers can be selected and "Black Boxed". Black boxes can be named, have a description and assigned other properties like colours, attachments etc. "Black boxes" may contain other black boxes.

To black box a set of models it is only necessary to select the boxes and then choose the option "black box" from the right mouse click menu.

By the term "black box" we include placing models within a graphical symbol or a graphical representation of a container, of any shape and/or colour. This need not necessarily be either black or a box.

In addition to the 3D viewer described above, Aptitude 3D also retains a standard 2D Viewer which provides a tree and folder view of the project. The 2D viewer can be more efficient for certain types of operation such as editing all the models of a particular type.

Figure 13:
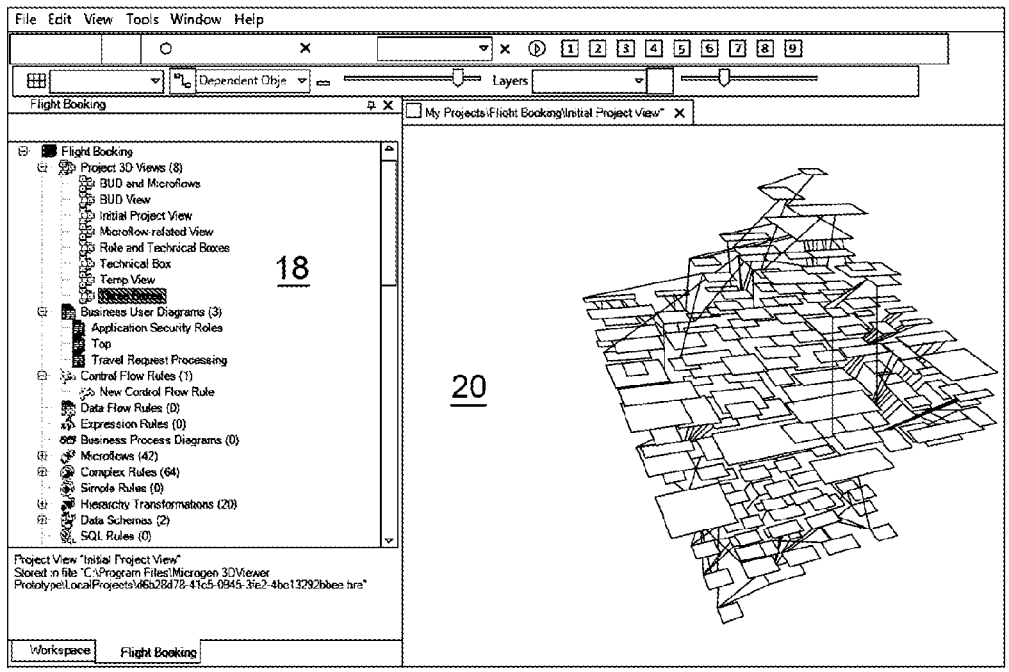
FIGS. 13 to 15 show the simultaneous presentation of 2D and 3D viewers.
Figure 14:
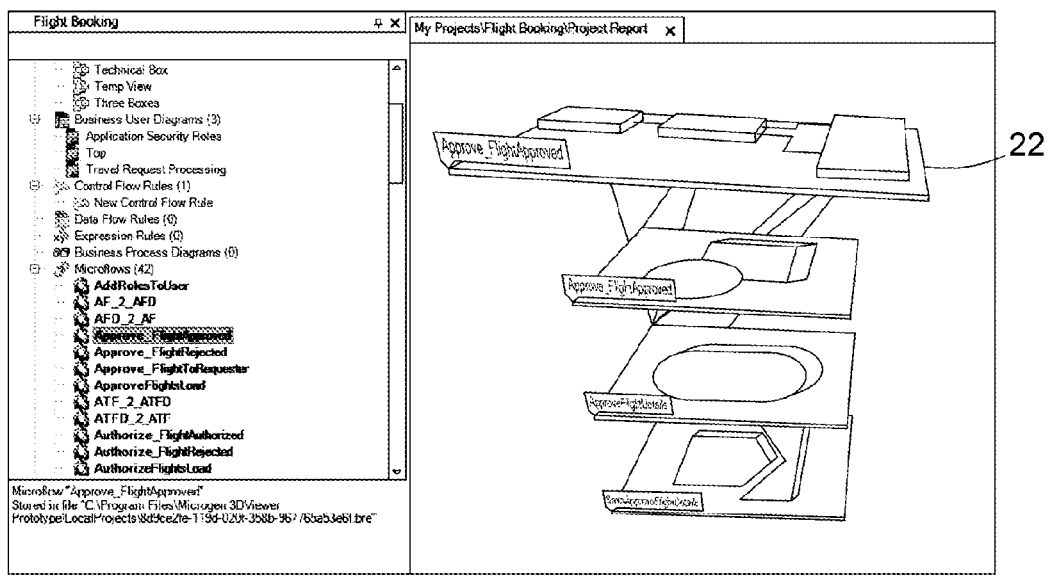
Figure 15:
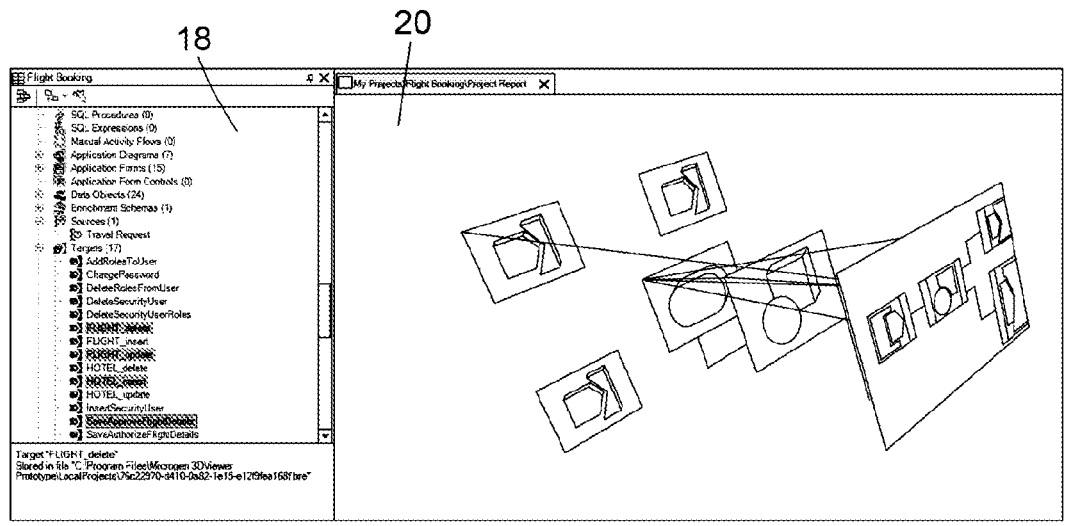

Furthermore, some very useful functionality can be achieved by the interworking of the two viewers. The simultaneous presentation of the two viewers is shown in FIGS. 13 to 15 and the user can switch between the two views with a single key-stroke. FIGS. 13 to 15 show both viewers presented in a single screen.

The co-existence of the two viewers allows the creation and storage of bespoke 3D views of the project. Models can be selected in the 2D viewer 18 and then shown in 3D in the 3D Viewer 20. This is shown in FIG. 14 where a Microflow model "Approve_FlightApproved" 22 has been selected in the 2D Viewer and then displayed in the adjacent 3D Viewer. It is possible to choose to display a model showing:

(a) It's direct dependencies
(b) Both direct and indirect dependencies
(c) Where it is used within the project In FIG. 14 the model 22 and only its direct dependencies are displayed.

This ability to display both direct and indirect dependencies and also show where a model is used within a project are very important aids to the management of complexity and to user productivity. When thinking how to change a model, it is important that all the dependent models are known and understood but a 2D viewer alone cannot provide this facility except in a clumsy fashion as it fails to show the relationships between models. The user may only be interested in the direct dependencies but often wants to see the indirect ones if the influence of the model is pervasive.

The ability to show where a particular model is used is also important. Most 2D IDE's achieve this by scanning the elements (most of them do not deal with models) and then producing a list of the places where a particular element is used. The programmer then edits every item on the list to ensure the changes to the selected element are propagated correctly throughout the project. Microgen Aptitude 3D allows all the affected models to be displayed within the 3D viewer from where they can be edited directly.

To produce a completely bespoke 3D view, models can be selected within the 2D view and then dragged and dropped onto the 3D Viewer. FIG. 15 shows the same model as FIG. 14 but with 4 additional models added. The additional models were selected in the 2D viewer 18 as shown in the left panel and then dragged and dropped onto the 3D viewer 20 where they have been placed in the correct layer for their type and any relationships with the other models displayed as connecting lines.

A bespoke 3D view can be also created from the existing 3D view, after selecting a subset of its models.

Within a layer, the models may be moved and organized through use of the mouse so as to arrange them to best suit the user's needs. This is an important aid to clarity as models can be functionally grouped so better revealing the structure of the project.

There are a number of criteria the user can choose to automatically group models within a layer. They include any combination of the following:
1) Place models which call each other close together
2) Place models which use the same data objects close together
3) Models which call the same lower level models should be grouped
4) Models which are called from the same higher level models should be grouped
5) Use the name of the models to determine grouping Note that these criteria are not mutually exclusive although conflicts can arise and the user is then asked to choose between the alternatives. These criteria are in addition to the facility for the user to manually move objects around.

Within a layer, the models can be manually grouped using containers of different shapes (user can e.g. drag a number of chosen models into a rectangular container). The container may have links defining its relationships to other containers or models. When the container is moved as a whole, all the elements it contains are also moved. Containers may have properties assigned like shapes, borders, names, descriptions, tags, colours and other visual signs, backgrounds. Containers may be visually collapsed into a small symbol and then expanded again showing all elements within them. Containers may contain containers.

A user can manually create additional layers, and can manually add and remove links between the graphical models, either in the same layer or different layers.

Rather than allowing Aptitude 3D to automatically create the 3D representation, the user can choose to create a bespoke 3D view. This can be done for example by selecting graphical models from another 3D view.

It is also possible for a user to manually move graphical models on a layer, or to manually group graphical models on a layer. A user can also use 2D containers (on layers) to organize groups of graphical models, and can link the containers with other containers and graphical models.

Figure 16:
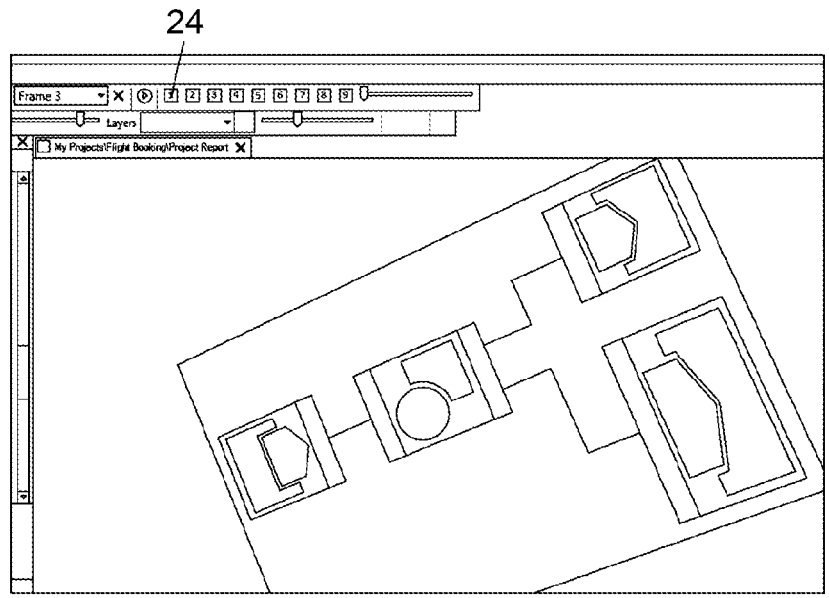
FIG. 16 shows how the user may record individual views in the 3D viewer, and assign each view to a numbered button.

Users will often work with multiple views of a project and the Aptitude 3D includes the facility to store a particular view and assign it to a button 24 on the 3D Viewer tool bar. In this way the user can effectively record a series of views, and assign each view to one of the numbered buttons 24. The user can then switch to a particular view simply by clicking the corresponding button 24 of the tool bar. This is shown in FIG. 16.

The first three numbered buttons 24 in the toolbar are highlighted showing that a particular view has been assigned to them.

A further facility which helps produce presentations of a project is that these views or "frames" can be animated and played back as a sequence. In this case, the views corresponding to the numbered buttons 16 are played back one after the other. This is useful for building presentations of the project particularly when it is required to illustrate data flows or the flow of control through a project. The animation sequence may contain any number of frames, not necessarily assigned to buttons 24.

Figure 27:
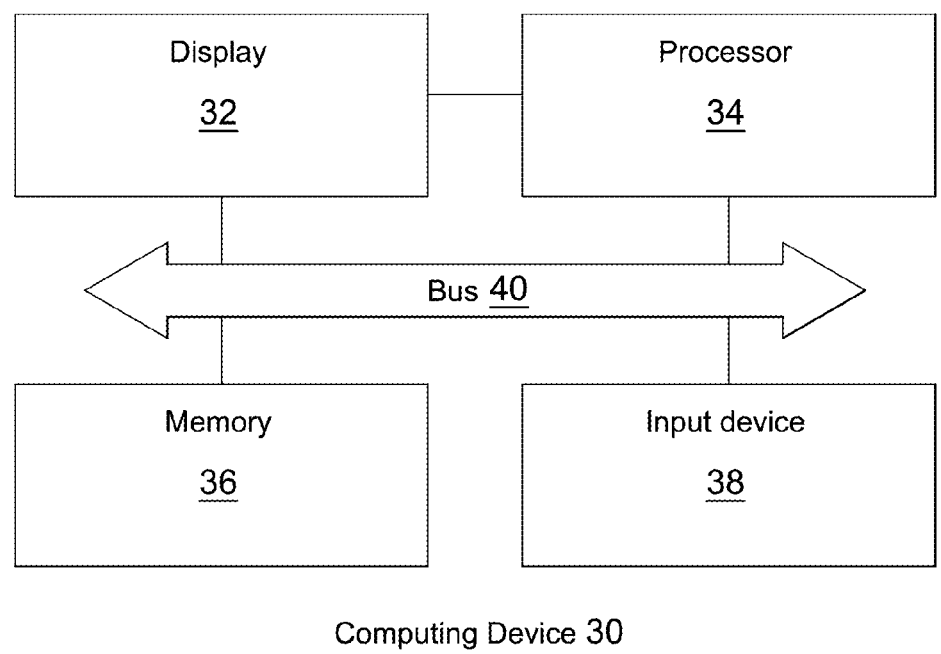
FIG. 27 shows a computing device suitable for implementing the present invention.

FIG. 27 shows a computing device 30, which may for example be a personal computer (PC), which is suitable for running the Aptitude 3D software. The computing device 30 comprises a display 32 for displaying information to the developer, a processor 34, a memory 36 and an input device 38 (for example a mouse and/or keyboard) for allowing the developer to input information. These elements are connected by a bus 40 via which information is exchanged between the components.

The 2D and 3D viewers of the Microgen Aptitude 3D Integrated Development Environment described herein may be used to create applications for use in any field, including for example engineering, process control, and business processes, and any field of science or technology.

Although the invention is shown and described with respect to certain embodiments, it should be clear that modifications will occur to those skilled in the art upon reading and understanding the specification, and the present invention includes all such modifications.

What is claimed is:

1. A method of creating a software application using an integrated development environment, IDE, running on a computing device having at least a processor, a memory, a display device and an input device, said method comprising:
retrieving from said memory and displaying on said display device a number of graphical elements each representing at least one operation to be performed on data;
after said retrieving and displaying steps, enabling a user of said computing device to select and arrange at least some of said graphical elements on said display device using said input device;
enabling said user to arrange graphical links between said selected graphical elements, wherein said selected graphical elements and said graphical links together form one or more graphical models of a process to be performed on data by said software application;
displaying in said IDE a 3D representation of said graphical model or models;
allowing said user to rotate said 3D representation in three dimensions so as to view said 3D representation from different angles;
said user creating a plurality of said graphical models, said graphical models being of at least first and second types;
said processor automatically causing said graphical models to be displayed in said 3D representation in a number of different three dimensional layers, said layers comprising at least a first layer containing graphical models of said first type and a second layer containing graphical models of said second type, wherein the organization of graphical models in one layer is automatically adjusted by said processor in dependence on the organization of graphical models in another layer;
allowing said user to switch a layer, or any combination of layers, on or off, so that said layer or combination of layers is visible or not visible in said 3D representation;
allowing said user to select any graphical model or set of graphical models, and then automatically remove from said 3D representation any graphical models which are not directly or indirectly dependent on the selected graphical model or models, or on which the selected graphical model or models are not directly or indirectly dependent; and
compiling, at said processor, said software application.

2. A method as claimed in claim 1, wherein said types of graphical models include any combination of the following:
Business User Diagrams;
Business Process Diagrams;
Microflows;
Control Flows;
Business Rules;

Application Processes;
Application Forms;
SQL Rules;
SQL Procedures; and
Enrichment Schemas and Data Schemas.

3. A method as claimed in claim 1, wherein said processor controls said 3D representation to show links between graphical models in different layers.

4. A method as claimed in claim 1, wherein said layers have a top layer which contains a Business User Diagram.

5. A method as claimed in claim 1, which further comprises allowing said user to adjust the spacing between any two layers in said 3D representation.

6. A method as claimed in claim 1, which further comprises said processor controlling said display device to display moving symbols on said graphical links, said moving symbols indicating the direction of the relationship represented by a graphical link.

7. A method as claimed in claim 1, which further comprises:
allowing said user to create each graphical model in an editor which allows said user to edit the graphical model and which displays, in an editor view, the graphical elements and links of the graphical model to the user; and
displaying each graphical model in said 3D representation as a scaled down view of the editor view of the graphical model.

8. A method as claimed in claim 1, which further comprises:
allowing said user to create each graphical model in an editor which allows said user to edit the graphical model and which displays, in an editor view, the graphical elements and links of the graphical model to the user; and
allowing said user to zoom in on a particular graphical model, and after zooming in on the graphical model to a particular extent, automatically displaying the graphical model in the editor view.

9. A method as claimed in claim 1, which further comprises:
allowing said user to select a graphical model, and on selection of the graphical model automatically displaying other graphical models in reduced contrast.

10. A method as claimed in claim 1, which further comprises:
allowing said user to remove from said display in said 3D representation any collection of graphical models or links.

11. A method as claimed in claim 1, which further comprises:
allowing said user to replace any collection of graphical models in said 3D representation by a representation of a container.

12. A method as claimed in claim 11, wherein any graphical links to or from graphical models replaced by said container are automatically redrawn in said 3D representation as graphical links to or from said container.

13. A method as claimed in claim 11, which further comprises:
allowing said user to include one container within another container in said 3D representation.

14. A method as claimed in claim 1, which further comprises:
displaying said 3D representation on said display device in a 3D viewer; and
displaying in a 2D viewer a 2D representation of said graphical models.

15. A method as claimed in claim 14, which further comprises allowing said user to drag and drop graphical models from said 2D viewer to said 3D viewer.

16. A method as claimed in claim 1, which further comprises allowing said user to record a plurality of views in said 3D representation.

17. A method as claimed in claim 16, which further comprises allowing said user to associate each recorded view with a different button on said display device, so that a recorded view is displayed on said display device when its associated button is activated by said user.

18. A method as claimed in claim 16, which further comprises allowing said user to create an animated sequence of said recorded views.

19. A method as claimed in claim 1, which further comprises automatically arranging close together in said 3D representation models which call each other.

20. A method as claimed in claim 1, which further comprises automatically arranging close together in said 3D representation models which use the same data objects.

21. A method as claimed in claim 1, which further comprises automatically grouping together in said 3D representation models which call the same lower level graphical models.

22. A method as claimed in claim 1, which further comprises automatically grouping together in said 3D representation models which are called from the same higher level models.

23. A method as claimed in claim 1, which further comprises automatically grouping together in said 3D representation models which share related names.

24. A programmed computer comprising at least a processor, a memory, a display device and an input device, wherein said computer is programmed to perform a method as claimed in claim 1.

25. A non-transitory computer-readable medium containing computer-readable instructions for performing a method as claimed in claim 1.

26. A non-transitory integrated development environment, IDE, for creating a software application, said IDE comprising:
a number of graphical elements which are displayed on a display device and which, after display on said display device, can be selected, arranged and interconnected by links within said IDE to form a number of graphical models of different types; and
a 3D viewer arranged to provide a 3D representation of said graphical models and said links and arranged to allow a user to rotate said 3D representation in three dimensions so as to view said 3D representation from different angles, said IDE being arranged to allow said user to create a plurality of said graphical models, said graphical models being of at least first and second types,
said 3D viewer being arranged to automatically display said graphical models in said 3D representation in a number of different three dimensional layers, said layers comprising at least a first layer containing graphical models of said first type and a second layer containing graphical models of said second type, wherein the organization of graphical models in one layer is automatically adjusted in dependence on the organization of graphical models in another layer;
said 3D viewer being arranged to allow said user to switch a layer, or any combination of layers, on or off, so that said layer or combination of layers is visible or not visible in said 3D representation;

said 3D viewer being arranged to allow said user to select any graphical model or set of graphical models, and then automatically remove from said 3D representation any graphical models which are not directly or indirectly dependent on the selected graphical model or models, or on which the selected graphical model or models are not directly or indirectly dependent; and said IDE being arranged to compile said software application.

27. A method as claimed in claim 1, which further comprises enabling said user to move said graphical models between said layers manually.

\* \* \* \* \*